United States Patent
Koh

(10) Patent No.: US 9,868,417 B2
(45) Date of Patent: Jan. 16, 2018

(54) METHOD FOR DISPLAYING WARNING MESSAGE OF SMART KEY SYSTEM

(71) Applicant: Dong Woo Koh, Seoul (KR)

(72) Inventor: Dong Woo Koh, Seoul (KR)

(73) Assignee: Hyundai Autron Co., LTD., Seongnam-si (KR)

( * ) Notice: Subject to any disclaimer, the term of this patent is extended or adjusted under 35 U.S.C. 154(b) by 236 days.

(21) Appl. No.: 14/104,841

(22) Filed: Dec. 12, 2013

(65) Prior Publication Data
US 2014/0159882 A1 Jun. 12, 2014

(30) Foreign Application Priority Data

Dec. 12, 2012 (KR) .................. 10-2012-0144780

(51) Int. Cl.
*B60Q 1/00* (2006.01)
*B60R 25/00* (2013.01)
*B60R 25/102* (2013.01)

(52) U.S. Cl.
CPC ............ *B60R 25/00* (2013.01); *B60R 25/102* (2013.01); *B60R 2325/205* (2013.01)

(58) Field of Classification Search
CPC ......... B60R 1/12; B60R 25/00; B60R 25/102; B60R 2325/205; B60R 25/305; B60R 25/245; B60R 25/406; B60R 25/241; B60R 25/64; B60R 25/252; B60R 25/2009; B60R 2025/1016; G07C 9/00563; G07C 9/00309
USPC ...... 701/300; 340/435, 425.5, 426.1, 426.13, 340/426.14, 426.15, 426.18, 426.16, 340/426.35, 426.36; 710/100
See application file for complete search history.

(56) References Cited

U.S. PATENT DOCUMENTS 4,383,241 A * 5/1983 Kojima ............... B60R 16/0373
340/460
5,204,663 A 4/1993 Lee
(Continued)

FOREIGN PATENT DOCUMENTS

DE 697 14 470 T2 5/2003
KR 10-2010-0079685 A 7/2010
KR 20100079685 * 7/2010

OTHER PUBLICATIONS

Deutsches Patent and Management Office, Office Action for German Patent Application No. 10 2013 225 741.4, dated Apr. 5, 2016, Germany.

*Primary Examiner* — Anh V La
(74) *Attorney, Agent, or Firm* — Baker & McKenzie LLP; Hyunho Park

(57) ABSTRACT

A method for displaying a warning message of a smart key system may include: a first step in which a control part of a smart key system generates two or more warning messages corresponding to two or more abnormalities/warnings, when the two or more abnormalities/warnings occur; a second step in which the control part repetitively and sequentially renews and inputs the two or more warning messages to a message queue buffer and controls the message queue buffer to buffer and output the two or more warning messages such that the two or more warning messages are circularly displayed on a display part; and a third step in which the control part ends the circular buffering operation for the two or more warning messages through the message queue buffer, when message renewal times for the two or more warning messages expire.

5 Claims, 4 Drawing Sheets

(56) References Cited

U.S. PATENT DOCUMENTS

2001/0012976 A1* 8/2001 Menig et al. .................. 701/1
2012/0303182 A1 11/2012 Choi
2012/0303255 A1* 11/2012 Wong et al. .................. 701/300

* cited by examiner

METHOD FOR DISPLAYING WARNING MESSAGE OF SMART KEY SYSTEM

CROSS-REFERENCES TO RELATED APPLICATIONS

The present application claims priority to Korean application number 10-2012-0144780, filed on Dec. 12, 2012, which is incorporated by reference in its entirety.

BACKGROUND OF THE INVENTION

The present invention relates to a method for displaying a warning message of a smart key system, and more particularly, to a method for displaying a warning message of a smart key system, which circularly displays a plurality of warning messages, generated at a time from a smart key system, on a display part of a vehicle such that the contents of the warning messages may be easily checked.

In general, a smart key system of a vehicle may perform various manipulations through remote control using a portable smart key, without inserting a separate key or manipulating an operating button. The various manipulations may include opening/closing a door, opening a hands-free device of a trunk, performing an electrical steering column lock function, and starting the vehicle.

The smart key applied to such a smart key system may include a remote control type and a card type. When a driver approaches the driver's vehicle in a state where the driver carries the smart key, the door may be automatically unlocked or the engine may be started, unlike a typical portable key device.

Furthermore, the smart key system may provide a convenient function for a driver. For example, the smart key system may generate warning messages for an abnormality/warning occurring in the smart key and various abnormalities/warnings occurring in the vehicle and provide the generated warning messages to the vehicle.

When a warning message is received from the smart key system, the warning message may be displayed in the form of text message or icon through a duster display part provided in an instrument panel or a display part of an audio video navigator (AVN), thereby informing the driver of the abnormality/warning.

At this time, when an abnormality/warning occurs, the smart key system may perform a buffering operation for a queue buffer according to the priority of the abnormality/warning and transmit a warning message to the display part of the vehicle for a predetermined time such as two seconds per one time. The display part of the vehicle may display the warning message received from the smart key system for the predetermined time. When the buffering output for the predetermined time is ended, an additional buffering output may be performed according to the characteristic of the abnormality/warning.

However, the message display function through the conventional smart key system does not include a priority control function for the buffering operation of the queue buffer. Thus, when two or more abnormalities/warnings occur to cause the smart key system to generate two or more warning messages, only one warning message among the two or more warning messages may be displayed, or the two or more warning messages may be randomly displayed without a predetermined interval provided therebetween. In this case, the driver may not sufficiently recognize the contents of the warning messages.

The related art of the present invention is disclosed in Korean Patent Laid-open Publication No. 2010-0079685 published on Jul. 8, 2010 and entitled "Smart key system and control method thereof".

SUMMARY OF THE INVENTION

Embodiments of the present invention are directed to a method for displaying a warning message of a smart key system, which is capable of circularly transmitting a plurality of warning messages for abnormalities/warnings to a display part of a vehicle at a predetermined interval such that the warning messages may be circularly displayed.

Embodiments of the present invention are directed to a method for displaying a warning message of a smart key system, which is capable of preferentially displaying a new warning message before a plurality of warning messages in a state where the plurality of warning messages are circularly displayed.

In one embodiment, a method for displaying a warning message of a smart key system may include: a first step in which a control part of a smart key system generates two or more warning messages corresponding to two or more abnormalities/warnings, when the two or more abnormalities/warnings occur; a second step in which the control part repetitively and sequentially renews and inputs the two or more warning messages to a message queue buffer and controls the message queue buffer to buffer and output the two or more warning messages such that the two or more warning messages are circularly displayed on a display part; and a third step in which the control part ends the circular buffering operation for the two or more warning messages through the message queue buffer, when message renewal times for the two or more warning messages expire.

In the first step, each of the two or more abnormalities/warnings may include any one of a warning message for abnormality/warning for a smart key unit and the smart key system and warning messages for abnormalities/warnings for operating systems of a vehicle.

In the first step, each of the warning messages corresponding to the two or more abnormalities/warnings may have different message renewal times depending on the characteristics of the abnormalities/warnings.

In the second step, when a new warning message is added as a new abnormality/warning occurs, the control part may repetitively and sequentially renew and input the new warning message as well as the two or more warning messages to the message queue buffer and control the message queue buffer to buffer and output the warning messages.

When the new warning message is added as the new abnormality/warning occurs, the control part may preferentially input the new warning message to the message queue buffer, before the two or more warning messages.

In the third step, when the message renewal times for the two or more warning messages expire, the control part may repetitively renew and input only the new warning message to the message queue buffer and control the message queue buffer to buffer and output the new warning message, for a predetermined time.

In the second step, the two or more warning messages outputted from the message queue buffer may be transmitted through any one data transmission method among controller area network (CAN) communication, RS232C communication, RS422 communication, RS485 communication, USB communication, Bluetooth communication, and Ethernet communication.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
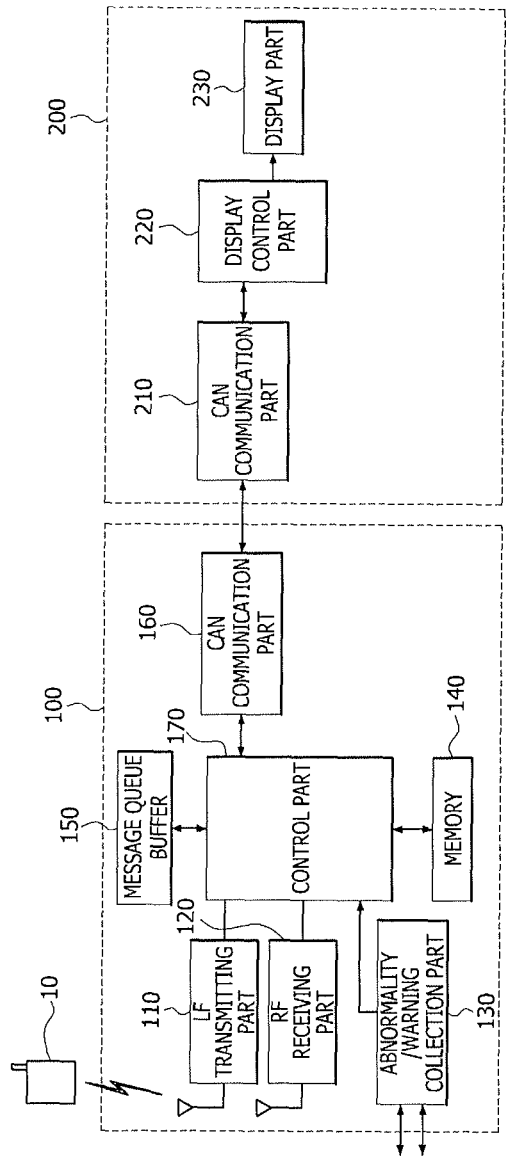
FIG. 1 is a diagram illustrating the configuration of a vehicle having a display function for a warning message of a smart key, to which a method for displaying a warning message of a smart key system in accordance with an embodiment of the present invention is applied.

FIG. 1 is a diagram illustrating the configuration of a vehicle having a display function for a warning message of a smart key, to which a method for displaying a warning message of a smart key system in accordance with an embodiment of the present invention is applied.

Referring to FIG. 1, the vehicle having a display function for a warning message of a smart key, to which the method in accordance with the embodiment of the present invention is applied, includes a smart key system 100 and a display device 200. The smart key system 100 includes a low frequency (LF) transmitting part 110, a radio frequency (RF) receiving part 120, an abnormality/warning collection part 130, a memory 140, a message queue buffer 150, a controller area network (CAN) communication part 160, and a control part 170. The display device 200 includes a CAN communication part 210, a display control part 220, and a display part 230.

The LF receiving part 210 is configured to transmit an LF signal for searching a smart key unit 10 through an LF antenna.

The RF receiving part 220 is configured to receive an RF signal transmitted from the smart key unit 10.

The abnormality/warning collection part 130 is configured to collect information on a specific abnormality/warning from a door system, a starting system, a transmission system, or a brake system of the vehicle, and provide the collected information to the control part 170.

The memory 140 is configured to store warning message data for abnormalities/warnings of the smart key unit 10 and the smart key system 100 and warning message data for abnormalities/warnings of the respective operating systems of the vehicle. Furthermore, the memory 140 stores a message renewal time which is differently set for a warning message for each abnormality/warning, according to the characteristic of the abnormality/warning.

The warning messages for the abnormalities/warnings of the smart key 10 and the smart key system 100 may include a warning message for battery discharge of the smart key unit 10, a warning message for informing a driver that the smart key unit 10 does not exist in the vehicle, and a warning message for a recognition error of key input due to an abnormality of the LF antenna or RF antenna.

Furthermore, the warning messages for the abnormalities/warnings of the respective operating systems of the vehicle may include a warning message for a case in which an engine is started a predetermined number of times or more in a state where a driver does not step on a brake pedal, a warning message for a case in which starting is turned off in a state where a transmission lever is located at a different position instead of a parking (P) position, and a warning message for a case in which the engine is not started even though a start button is manipulated a predetermined number of times, because the start button has a problem.

The message queue buffer 150 is configured to receive one or more warning message data and buffer and output the received warning message data. The message queue buffer 150 repeats an operation of receiving two or more warning message data and buffering and outputting the received data for a predetermined interval, according to circulating renewal control for the message data from the control unit 170.

The CAN communication part 160 is connected to the CAN communication part 210 of the display device 200, and configured to transmit the warning message data, which are sequentially buffered and outputted from the message queue buffer 150, to the CAN communication part 210.

In the present embodiment, the CAN communication method is applied as the data transmission method. However, the present embodiment is not limited thereto, but may include various data communication methods such as RS232C communication, RS422 communication, RS485 communication, USB communication, Bluetooth communication, and Ethernet communication.

When an abnormality/warning occurs in the smart key unit 10 and the smart key system 100 or abnormalities/warnings occur in the operating systems of the vehicle, two or more warning messages may be provided. In this case, the control part 170 reads warning message data for the corresponding abnormalities/warnings from the memory 140, and repetitively renew and input the warning message data for each warning message to the message queue buffer 150. Then, two or more warning messages are circularly buffered and outputted through the message queue buffer 150.

The control part 170 refers to a display time for each of the warning messages stored in the memory 140, and excludes warning messages, of which the display time expires among the warning messages which are circularly buffered through the message queue buffer 150, from the circular buffering.

When a new abnormality/warning occurs in a state where two or more warning message data are circularly buffered through the message queue buffer 150, the control part 170 arranges new warning message data based on the new abnormality/warning such that the new warning message data is preferentially buffered and outputted through the message queue buffer 150.

The CAN communication part 210 of the display device 200 is connected to the CAN communication part 160 of the smart key system 100, and configured to receive the warning message data, which are circularly buffered and outputted through the message queue buffer 150, through the CAN communication part 160 and provide the received data to the display control part 220.

The display control part 220 is configured to receive the plurality of warning message data, which are sequentially buffered and outputted through the message queue buffer 150 of the smart key system 100, through the CAN communication part 210 and control the display part 230 to sequentially display the warning message data.

The display device 200 may include a display control device provided in the instrument panel of the vehicle and an AVN device.

Figure 2A:
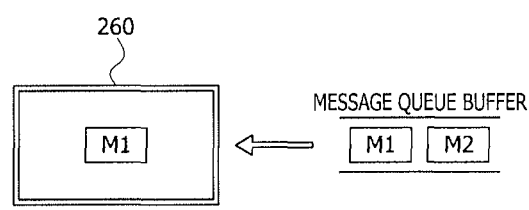
FIGS. 2A to 2C are diagrams illustrating that a plurality of warning messages are circularly renewed and buffered through a message queue buffer of a smart key system, in the method for displaying a warning message of a smart key system in accordance with the embodiment of the present invention.
Figure 2B:
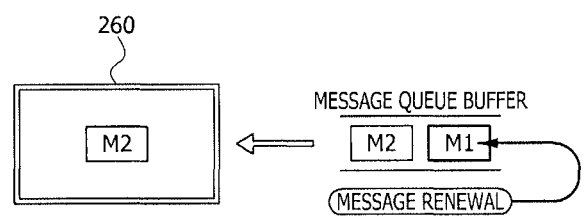
Figure 2C:
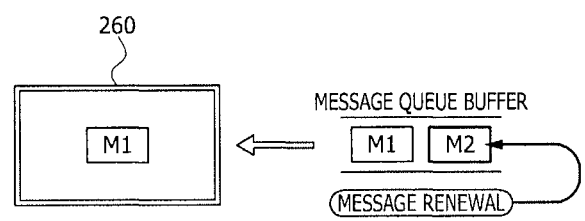

FIGS. 2A to 2C are diagrams illustrating that a plurality of warning messages are circularly renewed and buffered through the message queue buffer of the smart key system, in the method for displaying a warning message of a smart key system in accordance with the embodiment of the present invention.

Referring to FIG. 2A, when a first warning message M1 and a second warning message M2 are sequentially inputted to the message queue buffer 150, the control part 170 preferentially transmits the first warning message M1 to the display device 200 through the CAN communication unit 160 such that the display part 230 of the display device 200 displays the first warning message M1 for a predetermined time, for example, 2 seconds.

After the first warning message M1 is displayed, the second warning message M2 which was subsequently inputted to the message queue buffer 150 is displayed on the display part 230 as illustrated in FIG. 2B. The control part 170 renews the first warning message M1 displayed in FIG. 2A at the time where the second warning message M2 is displayed, and re-inputs the renewed message to the message queue buffer 150.

Referring to FIG. 2C, the first warning message M1 which was renewed and inputted to the message queue buffer 150 is outputted through buffering, and displayed on the display part 230. At this time, the control part 170 renews the second warning message M2 displayed in FIG. 2B and re-inputs the renewed second warning message M2 to the message queue buffer 150.

Thus, as illustrated in FIGS. 2A to 2C, the plurality of warning messages may be circularly inputted to the message queue buffer 150 through the message renewal process and then buffered and outputted, and the display part 230 of the display device 200 may circularly display the plurality of warning messages, which are circularly inputted and outputted through the message queue buffer 150, at a predetermined interval.

Figure 3A:
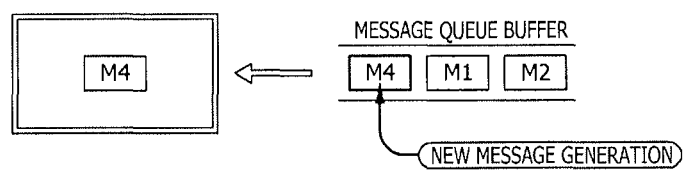
FIGS. 3A to 3C are diagrams illustrating that a new warning message is preferentially buffered in a state where a plurality of warning messages are circularly buffered through the message queue buffer of the smart key system, in the method for displaying a warning message of a smart key system in accordance with the embodiment of the present invention.
Figure 3B:
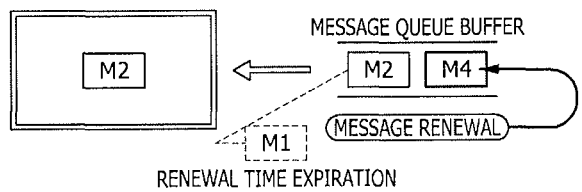
Figure 3C:
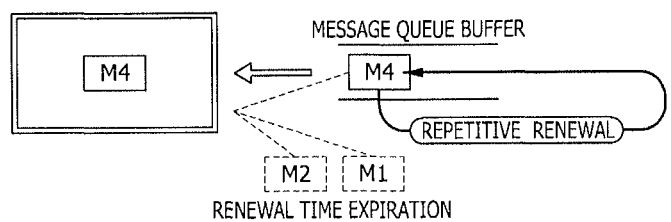

FIGS. 3A to 3C are diagrams illustrating that a new warning message is preferentially buffered in a state where a plurality of warning messages are circularly buffered through the message queue buffer of the smart key system, in the method for displaying a warning message of a smart key system in accordance with the embodiment of the present invention.

Referring to FIG. 3A, when a fourth warning message M4 is generated as a new warning message in a state where first and second warning messages M1 and M2 are sequentially stored in the message queue buffer 150, the control part 170 inputs the fourth warning message M4 to the message queue buffer 150 such that the fourth warning message M4 is arranged before the first and second warning messages M1 and M2 stored in the message queue buffer 150. Then, the fourth warning message M4 is preferentially outputted before the first and second warning messages M1 and M2, and displayed on the display part 230.

Furthermore, the control part 170 circularly inputs the first, second, and fourth warning messages M1, M2, and M4 to the message queue buffer 150 according to the input sequence such that the first, second, and fourth warning messages M1, M2, and M4 are circularly displayed on the display part 230.

In such a state, when the renewal time of the first warning message M1 among the first, second, and fourth warning messages M1, M2, and M4 expires as illustrated in FIG. 3B, the control part 170 circularly renews and inputs only the second and fourth warning messages M2 and M4 to the message queue buffer 150 in a state where the first warning message M1 is excluded, and the second fourth warning messages M2 and M4 are circularly buffered and outputted through the message queue buffer 150. Then, only the second and fourth warning messages M2 and M4 excluding the first warning message of which the renewal time expired are circularly displayed on the display part 230.

Furthermore, when the renewal times of the first and second warning messages M1 and M2 among the first, second, and fourth warning messages M1, M2, and M4 expire as illustrated in FIG. 3C, the control part 170 circularly renews and inputs only the fourth warning message M4 to the message queue buffer 150 in a state where the first and second warning messages M1 and M2 are excluded. Then, only the fourth warning message M4 is displayed on the display part 230.

Referring to FIG. 3C, when only one warning message is stored in the message queue buffer 150, the control part 170 may shorten a buffer input renewal time of the corresponding warning message to a predetermined time, for example, 10 seconds.

Now, the method for displaying a warning message of a smart key system in accordance with the embodiment of the present invention will be described with reference to FIG. 4.

Figure 4:
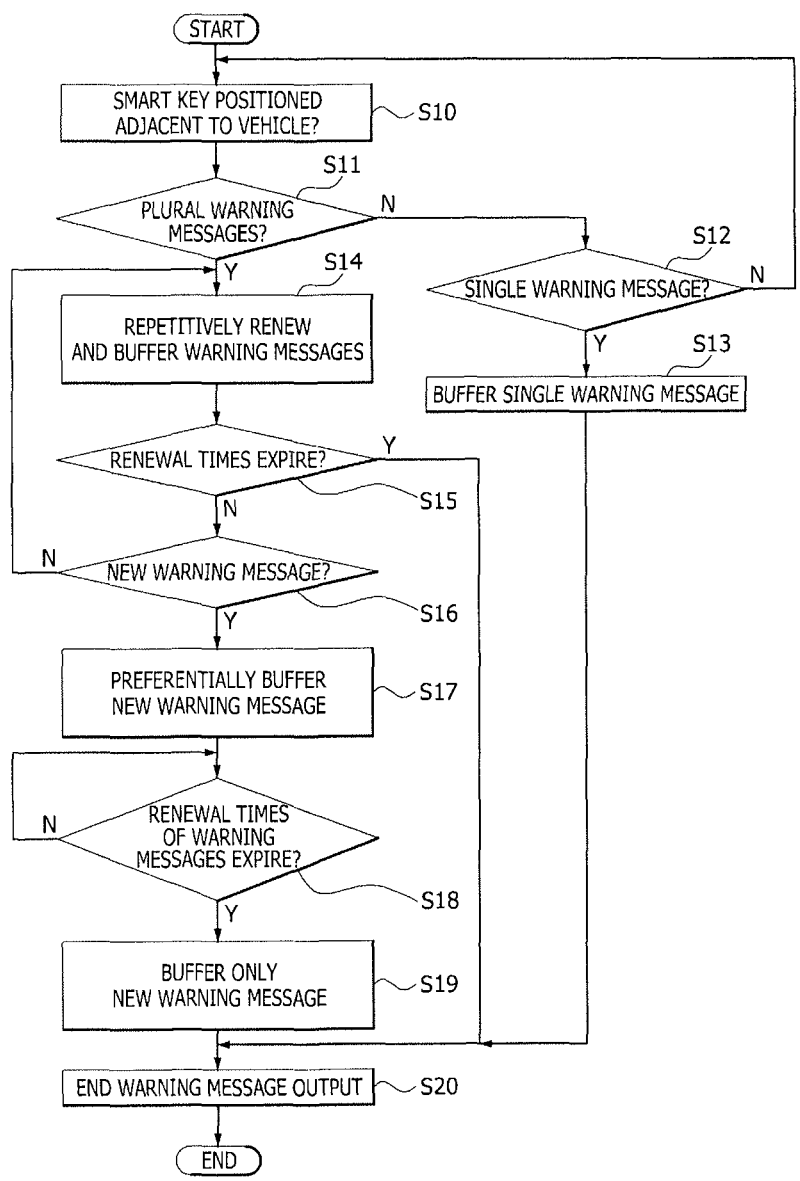
FIG. 4 is a flowchart for explaining the method for displaying a warning message of a smart key system in accordance with the embodiment of the present invention.

FIG. 4 is a flowchart for explaining the method for displaying a warning message of a smart key system in accordance with the embodiment of the present invention.

First, when the smart key unit 10 is positioned adjacent to the vehicle 20 at step S10, the control part 170 of the smart key system 100 determines whether or not to generate a plurality of warning messages as two or more abnormalities/warnings occur, at step S11.

When it is determined at step S11 that two or more abnormalities/warnings did not occur, the control part 170 determines whether or not to generate a single warning message as a single abnormality/warning occurs, at step S12. When it is determined that a single abnormality/warning occurred, the control part 170 inputs the single warning message to the message queue buffer 150 and controls the message queue buffer 150 to buffer and output the single warning message. Then, the single warning message is displayed through the display part 230 of the display device 200 for a predetermined time, at step S13.

On the other hand, when it is determined at step S11 that a plurality of warning messages should be generated as two or more abnormalities/warnings occurred, the control part 170 reads a plurality of warning messages corresponding to the respective abnormalities/warnings from the memory 140, sequentially inputs the read warning messages to the message queue buffer 150, and controls the message queue buffer 150 to buffer and output the warning messages. Then, the plurality of warning messages are sequentially displayed through the display part 230 of the display device 200 at a predetermined interval of 2 seconds, for example. Furthermore, the control part 170 repetitively renews and re-inputs the warning messages to the message queue buffer 150. Thus, the plurality of warning messages are circularly displayed through the display part 230, at step S14.

In such a state, the control part 170 determines whether the renewal time for each of the warning messages which are circularly buffered through the message queue buffer 150 expires or not, at step S15.

When it is determined at step S15 that there are no warning messages of which the message renewal times expired among the plurality of warning messages, the control part 170 determines whether or not to additionally generate a new warning message as a new abnormality/warning occurs, at step S16.

When it is determined at step S16 that a new abnormality/warning did not occur, the control part 170 returns to step S14 to control the message queue buffer 150 to circularly buffer the plurality of warning messages.

On the other hand, when it is determined at step S16 that a new warning message should be generated as a new abnormality/warning occurred, the control part 170 generates a new warning message corresponding to the new abnormality/warning based on the data stored in the memory 150, and preferentially inputs the new warning message to the message queue buffer 150 such that the new warning message is preferentially displayed on the display part 230 of the display device 200 at step S17.

Then, the control part 170 determines whether or not to end the message renewal process according to a message renewal time preset for each of the warning messages which are circularly buffered through the message queue buffer 150, at step S18.

When it is determined at step S18 that the message renewal process for the plurality of warning messages should be ended as the message renewal time for each of the warning messages expires, the control part 170 ends the circular buffering operation for the plurality of warning messages, and controls the message queue buffer 150 to buffer and output only the new warning message of which the message renewal time does not expire, at step S19.

Then, when a predetermined time passes after the single warning message is buffered through the message queue buffer 150 in the state of step S13 or S19, the buffering output for the single warning message is ended at step S20.

Furthermore, when it is determined at step S15 that the message renewal time for each of the warning messages which are circularly buffered through the message queue buffer 150 expired, the control part 170 ends the buffering output for the warning messages.

In accordance with the embodiment of the present invention, the smart key system of the vehicle circularly outputs and transmits a plurality of warning messages for two or more abnormalities/warnings through the message queue buffer and then provides the plurality of messages to the display part of the vehicle, and the display part of the vehicle may circularly display the plurality of warning messages at a predetermined interval. Thus, a driver may easily recognize the contents of the plurality of warning messages, and rapidly take subsequent measures for the abnormalities/warnings.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method for displaying a warning message of a smart key system, comprising:
    a first step in which a control part of a smart key system generates two or more warning messages corresponding to two or more abnormalities/warnings, when the two or more abnormalities/warnings occur;
    a second step in which the control part repetitively and sequentially renews and inputs the two or more warning messages to a message queue buffer and controls the message queue buffer to buffer and output the two or more warning messages such that the two or more warning messages are circularly displayed on a display part;
    a third step in which the control part generates a new warning message corresponding to a new abnormality/warning, repetitively and sequentially renews and inputs the new and the two or more warning messages to the message queue buffer, and controls the message queue buffer to buffer and output the new and the two or more warning messages; and
    a fourth step in which the control part stops renewing and inputting at least one of the two or more warning messages to the message queue buffer when a message renewal time expires for the at least one of the two or more warning messages, wherein the message renewal time expires within a first predetermined time period,
    wherein in the fourth step, when message renewal times for the two or more warning messages expire, the control part repetitively renews and inputs only the new warning message to the message queue buffer and controls the message queue buffer to buffer and output the new warning message, for a second predetermined time period,
    wherein the second predetermined time period is shorter than the message renewal times for the two or more warning messages.

2. The method of claim 1, wherein in the first step, each of the two or more abnormalities/warnings comprises any one of a warning message for abnormality/warning for a smart key unit and the smart key system and a warning message for abnormalities/warnings for operating systems of a vehicle.

3. The method of claim 1, wherein in the first step, each of the warning messages corresponding to the two or more abnormalities/warnings has different message renewal times depending on the characteristics of the abnormalities/warnings.

4. The method of claim 1, wherein when the new warning message is added as the new abnormality/warning occurs, the control part preferentially inputs the new warning message to the message queue buffer, before the two or more warning messages.

5. The method of claim 1, wherein in the second step, the two or more warning messages outputted from the message queue buffer are transmitted through any one data transmission method among controller area network (CAN) communication, RS232C communication, RS422 communication, RS485 communication, USB communication, Bluetooth communication, and Ethernet communication.

* * * * *